United States Patent [19]
Rubin et al.

[11] Patent Number: 5,680,573
[45] Date of Patent: Oct. 21, 1997

[54] METHOD OF BUFFERING DATA OBJECTS IN A DATABASE

[75] Inventors: David S. Rubin, San Francisco; Robert E. Mihalyi, Castro Valley; David A. Marshall, Concord, all of Calif.

[73] Assignee: Sybase, Inc., Emeryville, Calif.

[21] Appl. No.: 273,867

[22] Filed: Jul. 12, 1994

[51] Int. Cl.[6] .................................................. G06F 12/08
[52] U.S. Cl. .................................... 395/456; 395/445
[58] Field of Search ................................ 395/445, 446, 395/456, 460, 601, 602

[56] References Cited

U.S. PATENT DOCUMENTS

| | | | |
|---|---|---|---|
| 4,989,132 | 1/1991 | Mellender et al. | 395/705 |
| 5,452,445 | 9/1995 | Hallmark et al. | 395/602 |

OTHER PUBLICATIONS

Hennessy et al., "Computer Architecture A Quantitative Approach", 1990, pp, 411–412.
Schneider et al., "Concepts in Data Structures & Software Development", 1991, pp. 198, 318–329.
IBM Technical Disclosure Bulletin, vol. 21 No. 10 Mar. 1979, p. 4199, "Frequently Used Data Flush Avoidance in Cache Backing Store".

Primary Examiner—Eddie P. Chan
Assistant Examiner—Kevin L. Ellis
Attorney, Agent, or Firm—Hickman Beyer & Weaver LLP

[57] ABSTRACT

Computer systems and computer implemented methods are provided for managing memory in a database management system. The computer memory is partitioned into a plurality of buffer caches, each of which is separately addressable. One buffer cache is set aside as a default buffer cache, while the other buffer caches are reserved for specific data objects meeting certain predefined criteria. Those objects meeting the predefined criteria are stored in reserved buffer caches where they are likely to remain for a relatively long period of time (in comparison to data objects stored in the default buffer caches). A buffer cache may have a plurality of memory pools, each of which contains multiple storage blocks. The storage blocks in a given memory pool are identically sized, while the storage blocks in one memory pool are sized differently from the storage blocks in another memory pool.

13 Claims, 12 Drawing Sheets

| MASS SIZE | POOL SIZE (K) | WASH % | STATUS | NAME |
|---|---|---|---|---|
| 2 | 600 | 5 | NORMAL | DATA 0 |
| 16 | 200 | 10 | NORMAL | DATA 0 |
| 2 | 600 | 5 | LOG | LOG |
| 32 | 100 | 10 | LOG | LOG |
| 64 | 50 | 10 | LOG | LOG |
| 2 | 200 | 10 | NORMAL | FOO |
| 32 | 200 | 15 | NORMAL | FOOBAR |

*FIG. 6*

METHOD OF BUFFERING DATA OBJECTS IN A DATABASE

BACKGROUND OF THE INVENTION

The present invention relates to data storage management in database systems. More particularly, the present invention relates to the structure and use of buffer caches in database management systems.

Databases add data to and retrieve data from mass storage devices during normal operation. Unfortunately, such storage devices are typically mechanical devices such as disks or tape drives which transfer data only rather slowly. Thus, databases which must frequently access information stored on disks can be somewhat slow. To speed up the access process, some databases employ a "buffer cache" which is a section of relatively faster memory (e.g., RAM) allocated to store recently used data objects. Throughout the remainder of the specification, this faster memory will simply be referred to as "memory," as distinguished from mass storage devices such as disks. Memory is typically provided on semiconductor or other electrical storage media and is coupled to the CPU via a fast data bus. Because the transfer of data in memory is governed by electronic rather than mechanical operations, the data stored on the memory can be accessed much more rapidly than data stored on disks. In fact, the ratio of memory access speed to disk access speed is usually at least 10:1. That is, information stored in memory can be accessed at least ten times faster than the same information stored in a disk.

Because the buffer cache has a limited size, some method must be employed for controlling its content. Conventionally, data storage systems employ a "least recently used—most recently used" (LRU/MRU) protocol to queue data objects in the buffer cache. Every time a database operation accesses a data object in an LRU/MRU system, that object is moved to the head of the queue (i.e., it is the "most recently used" data object). Simultaneously, the data objects that have not been used are moved one step toward the end of the queue. Infrequently used objects thus migrate toward the end of the queue, and ultimately are deleted from the buffer cache to make room for new data objects copied from disks. Thus, if a request is made to access a data object not currently in the buffer cache (e.g., it is on a disk), that object is added to the cache and the data object at the bottom of the queue (i.e., the "least recently used" object) is deleted. In this manner, the most recently used data objects are the only objects stored in the buffer cache at any given time.

Unfortunately, this process of memory management is somewhat random and therefore frequently fails to make the most efficient use of the buffer space. For example, if a very frequently-used data object (a "hot" object) is accessed at regular but relatively lengthy intervals, the frequently-used data object may actually be deleted from the buffer cache before it can be reaccessed. Thus, that object must be recopied from a disk each time that it is used.

Conventional buffer cache memory management systems also have problems in the way they store widely varying volumes of data. The buffer cache is typically divided into a plurality of storage blocks, each of equal storage capacity (e.g., 2 kilobytes). Unfortunately, if a large volume of data is copied to the buffer cache in one transaction, that data must be separately loaded into memory as small chunks sized to fit within the individual storage blocks. For example, assume a program must read a 2,000,000 kilobyte chunk of data. If the storage blocks are 2 kilobytes long, the computer has to do 1,000,000 I/O (input output) operations to copy the entire volume of data. This can considerably slow the operation of the database. On the other hand, if a buffer cache is divided into larger storage blocks (e.g., 64 kilobytes) it will accommodate larger volumes of data, thus reducing the number of I/O operations. Unfortunately, such larger storage blocks are inefficiently utilized when small volumes of data are copied from disks. For instance, reading a 2 kilobyte page into a 64 kilobyte storage block wastes 62 kilobytes of that block.

In view of the above problems, it would be desirable to more efficiently manage buffer cache memory. And in fact, some research has been conducted to identify better methods of memory management. However, these approaches have met with little success because they ultimately attained efficiency only by making the buffer memory space very large, and thus reducing the amount of memory available for other computational resources such as the operating system and individual programs.

SUMMARY OF THE INVENTION

The present invention provides computer systems and computer implemented methods in which the memory is partitioned into a plurality of buffer caches, each of which is separately addressable. In general, the steps of a preferred embodiment of this invention include the following: (1) allocating at least two portions of the memory as buffer caches, (2) reserving at least one of the buffer caches for data objects meeting certain predetermined criteria, and (3) storing a data object meeting the predetermined criteria in the reserved buffer cache when that data object is accessed from the database.

The "predefined criteria" of the method may be any of many possible limitations specified by a user or system developer. For example, the predefined criteria may require that data objects pertain to particular subject matter (e.g., sales of a widget). In a preferred embodiment, the computer system determines whether a given data object meets the predefined criteria by checking a database catalog listing those objects (preferably tables and indexes) meeting the predefined criteria. The user would have previously specified the contents of the catalog by "binding" particular objects meeting the predefined criteria to particular reserved buffer caches. If the system determines that a data object to be accessed is not bound to any reserved cache, that object will be stored in an unreserved default buffer cache. Thus, hot objects (i.e., frequently accessed objects that meet the predefined criteria) are stored in reserved buffer caches where they remain undiluted, readily available to the system. In preferred embodiments, all buffer caches—reserved and default—are managed by LRU/MRU rules.

Another aspect of the invention provides a computer system and associated method for buffering data of potentially differing volumes. The method requires allocation within a buffer cache of at least fast and second memory pools, each of which have user configurable sizes. The first memory pool contains multiple identical storage blocks, each having a fast storage capacity. The second memory pool also contains multiple identical storage blocks, but each of these has a second storage capacity which is greater than the first storage capacity. The particular storage capacities and numbers of storage blocks in each memory pool may be designated by the user. Thus, the fast memory pool contains multiple relatively small data blocks and the second memory pool contains multiple relatively large memory blocks. When access to a data object is required, the computer system performs the following steps: (1) it estimates the volume of data which will be copied to the buffer cache, (2) based upon the volume of data estimated, it determines in which memory pool(s) to copy the data objects in the volume, and (3) it stores data in the memory pool(s) identified in step (2). The volume of data referenced here may be associated with a particular transaction such as downloading a series of records for use in a report. Because the buffer caches have at least two differently sized storage blocks, the data objects associated with a given volume of data can be stored in a block that requires relatively few I/Os (in the case of large data volumes) or in a block that efficiently utilizes the size of the data object (in the case of small data volumes).

In some embodiments, the volume of data is estimated by determining whether the volume of data is selected randomly, i.e., whether a single data object is selected by itself, rather than as part of a group of related objects. If the selected data object is randomly selected, the object is stored in the first memory pool, (i.e., the memory pool having the smaller data blocks). If, on the other hand, the selected data object is not randomly selected, the system assumes that a larger volume of data is being copied, and it stores the data object in the second memory pool. In some preferred embodiments, three or more memory pools are allocated in a buffer cache. This allows additional flexibility in storing data objects efficiently.

These and other features of the present invention will be described in more detail in the following specification of the invention and the figures.

BRIEF DESCRIPTION OF THE DRAWINGS

FIG. 6 is a depiction of a system cache catalog in accordance the present invention;

DESCRIPTION OF THE PREFERRED EMBODIMENTS

1. Definitions

Figure 1:
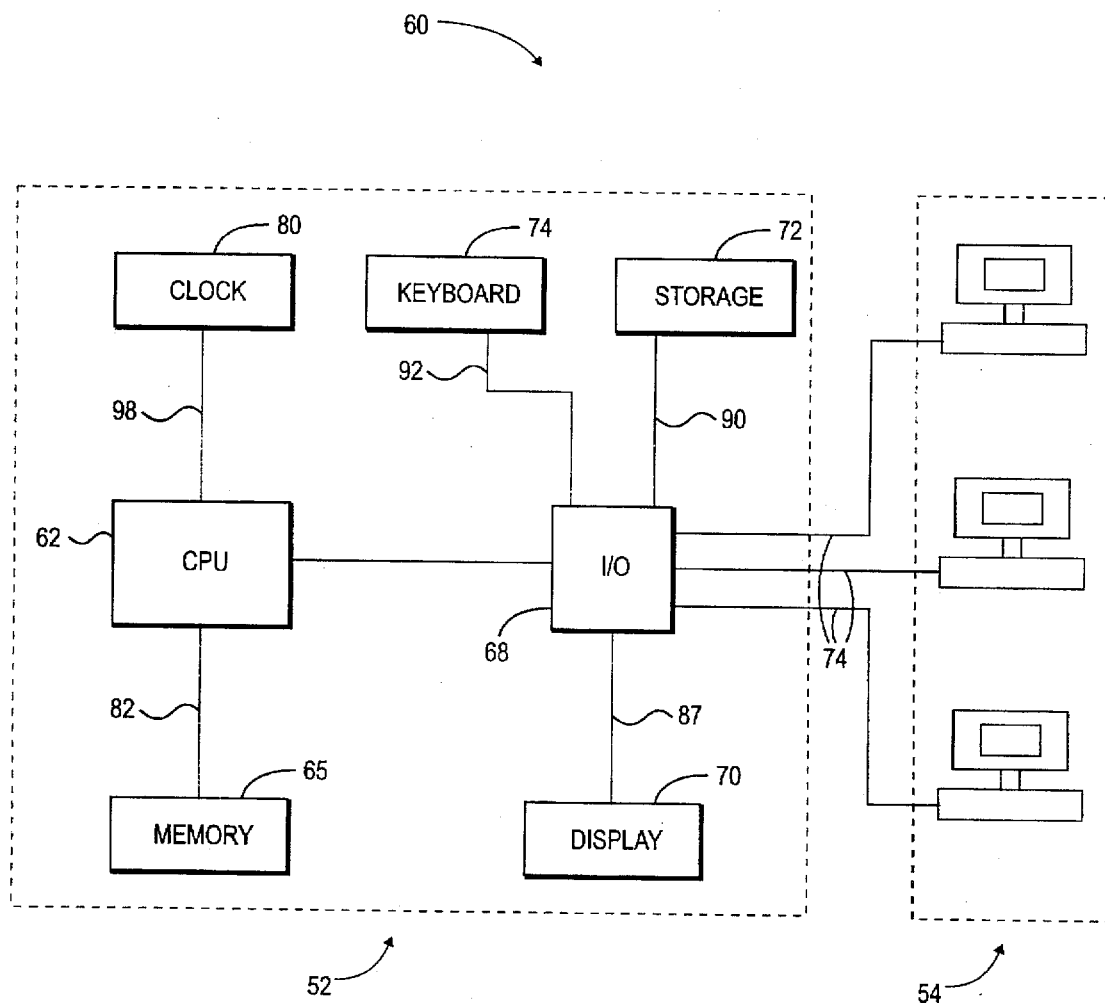
FIG. 1 is a block diagram of a client-server computer system that may be used to implement the memory management system of this invention.

The following terms are used in the instant specification. Their definitions are provided to assist in understanding the preferred embodiments described herein.

A "data object" is a database article stored as one or more database pages. Examples of data objects include tables, tuples, logs for databases, statistics pages, views, stored procedures, etc. Data objects may have attributes such as sizes, names, types, etc. A particularly important attribute in the context of this invention is the "binding" objects may have to a particular buffer cache. Data objects are bound to buffer caches reserved specifically for them.

"Pages" are logical contiguous storage areas that are read from or written to mass storage devices. Each page used by a database has the same size, e.g. 2 kilobytes. Pages have a header portion and a body portion. The header portion provides metadata such as a pointer to the next page, the status of the record including any recent changes, the number of rows on the page, the page number, etc. The body portion may include data, log, or code. A single page can contain multiple records, but each of those records must belong to the same table. A single table, however, can be divided over more than one page.

A "buffer cache" or simply "cache" is a section of memory allocated to temporarily hold data objects. A data object is transferred to a buffer cache from a storage device such as a disk when a database operation accesses that data object. In this invention, a buffer cache may be divided into two or more storage regions or "memory pools" each of which has a plurality of identically sized storage blocks or MASSes.

A MASS ("Memory Address Space Segment")—sometimes referred to herein as a "storage block"—is a contiguous block of address space in a buffer cache. It is the basic unit of I/O in a given buffer cache. Data objects may be written to, read from, and deleted from MASSes. MASSes are somewhat analogous to pages in a disk, but unlike pages, MASSes may have different storage capacities.

A "memory pool" is an area of address space allocated within a buffer cache and consisting of multiple MASSes of a defined identical size. A single buffer cache may contain multiple memory pools, each having different sized MASSes.

A "hash table" is a look-up table associated with an individual buffer cache. It provides pointers to the various data objects currently stored in the associated buffer cache. The location of a pointer within the hash table is a mathematical function of certain attributes of the object associated with the pointer. When access to particular data object is required, the system checks the appropriate hash table to determine whether the object is stored in memory before retrieving the object from a disk.

"On Line Transaction Processing" ("OLTP") is an environment characterized by multiple on-line concurrent and update operations. OLTP assumes that the system is carrying out many short transactions. For example, updating bank customer' account balances after each ATM transaction is an example of an OLTP environment. Each such OLTP event in this example entails nothing more than adding or subtracting the dollar amount deposited or withdrawn from the customer's account. Typically, it is desirable that data be read from the disk one page at a time in an OLTP environment.

"Decision Support System" ("DSS") is an environment characterized by retrieval oriented operations that are used to support decision making. DSS supposes larger transactions than used in OLTP, usually involving multiple pages. Examples of the kinds of questions handled with DSS include (1) how many people withdrew money from the bank today? and (2) what was the total amount of money withdrawn from the bank today? Typically the transaction requests large blocks of data which are copied from the disks into multiple MASSes.

"Locking" refers to a mechanism to prevent multiple concurrent user updates from interfering with one another so as to avoid any update anomalies. For purposes of this invention, each buffer cache in memory may be separately locked and unlocked.

A "system catalog" is a system table containing metadata (i.e., information about data in the system). The metadata is typically provided as tuples or rows describing certain database objects. Thus, each catalog row may include various attributes of a database object such as its name, internal ID, binding, owner, type (e.g., system table, user table, view, procedure, trigger, referential constraint, etc.), creation date, and audit settings. "System cache" catalogs of this invention contain attributes of named buffer caches such as their size, how they are partitioned, the sizes of their storage blocks, etc. "System attributes" catalogs of this invention contain information identifying any named buffer caches to which data objects in the catalog are bound.

A "system administrator" is a database administrator who has various administrative roles such as installing the server, managing disk storage, diagnosing and reporting system problems, backing up and loading databases, granting permissions to and ownership of database objects. In addition, the system administrator can define how buffer caches are partitioned in accordance with the present invention.

A "stored procedure" is a collection or encapsulation of statements, routines, built in calls, or other stored procedure calls describing an operation within a database. The statements comprising the procedure may be written in a database language such as ANSI standard structured query language "SQL" or other database language. Alternatively, the stored procedure statements may be written in a host language such as COBOL, C, PL/1, dBASE, INFORMIX 4GL, etc. The stored procedure code may be performance optimized so that it executes efficiently.

2. PHYSICAL SYSTEM FOR IMPLEMENTING MEMORY MANAGEMENT METHODS

The invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as estimating, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Referring now to FIG. 1, a preferred computer network 60 of the present invention includes a server 52 and multiple clients 54. In preferred embodiments, databases and database management systems are stored on a "server" while the various subjects can access the database through various "clients" which may be PCs, workstations, etc. in communication with the server. The client-server model of database management is well known to those of skill in the art and is discussed in various sources such as, for example, "The Guide to SQL Server" by Aloke Nath, Addison-Wesley Publishing Company, Inc., Reading, Mass. (1990).

The server 52 in accordance with the present invention includes a central processing unit (CPU) 62, input/output (I/O) circuitry 68, and memory 65—which may be read only memory (ROM) and/or random access memory (RAM). The server 52 may also optionally include a display 70, a mass storage unit 72, a keyboard 74, and a clock 80.

In one embodiment, the CPU 62 is preferably one or more microprocessor chips selected from complex instruction set computer (CISC) chips, reduced instruction set computer (RISC) chips, or other available chips. CPU 62 is coupled to memory 65 by a hi-directional data bus 82 but may also be coupled by unidirectional data bus in the case of ROM. Memory 65 is also coupled to CPU 62 by appropriate control and address busses, as is well known to those skilled in the art.

CPU 62 is coupled to the I/O circuitry 68 by bi-directional data bus 86 to permit data transfers with peripheral devices. I/O circuitry 68 preferably includes a number of latches, registers and direct memory access (DMA) controllers. The purpose of I/O circuitry 68 is to provide an interface between CPU 62 and such peripheral devices as display assembly 70, mass storage 72 (e.g., disks), keyboard 74, and clients 54. Display assembly 70 of server 52 receives data from I/O circuitry 68 via bus 87 and displays that data on a suitable screen. Mass storage 72 can be coupled to I/O circuitry 68 by a bi-directional data bus 90. Generally, mass storage 72 will be a hard disk drive, a tape drive, or some other long-term storage device.

The keyboard 74 communicates with the CPU 62 via data bus 92 and I/O circuitry 68. In addition to keyboard 74, other types of input device can also be used in conjunction with the present invention. For example, a computer mouse, a track ball, or a pen-based tablet can be used to manipulate a pointer on display screen 70. Clock 80 preferably comprises a real-time clock to provide real-time information to the system 60. Alternatively, clock 80 can simply provide regular pulses to, for example, an interrupt port of the CPU 62 which can count the pulses to provide the time function. Clock 80 is coupled to CPU 62 by a data bus 98.

The clients 54 may include terminals, personal computers, workstations, minicomputers, and mainframes. For purposes of this invention, any data processing devices coupled to server 52 are clients. It should be understood that the clients may; be manufactured by different vendors and may also use different operating systems such as MS-DOS, UNIX, OS/2, MAC OS and others. Clients 54 are connected to I/O circuitry 68 via bi-directional lines 74. Bidirectional lines 74 may be any suitable media such as coaxial cable, twisted pair wiring, fiber optic line, radio channels, and the like. Further, the network resulting from the interconnection of the lines 74 may assume a variety of topologies, including ring, bus, star, and may include a collection of smaller networks linked by gateways and bridges.

Figure 2:
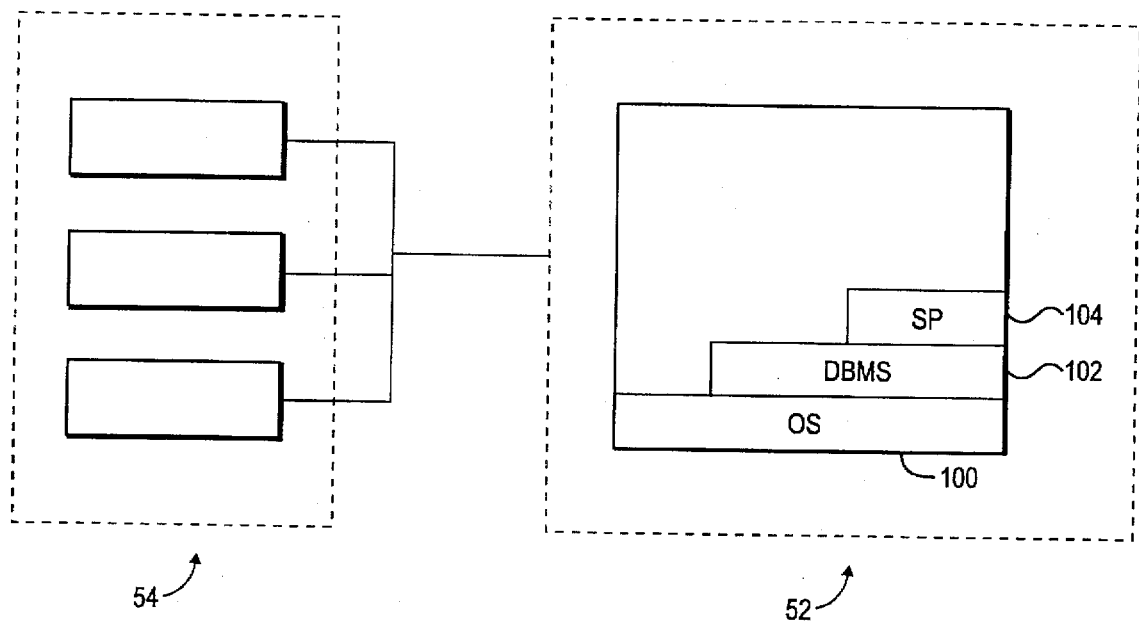
FIG. 2 is a block diagram detailing the operating system layers employed in the client-server computer system of FIG. 1.

FIG. 2 provides another illustration of the physical system of this invention, this time in connection with the layers of processing associated with a client-server architecture of the present invention. The server 52 includes a base operating system 100 associated with the computer hardware comprising the server. As with the clients 54, it should be understood that the server may use different operating systems such as MS-DOS, UNIX, VMS, MAC OS and others. The clients, of course, need not use the same operating system as the server. One particular suitable server operating system for the present invention is OS/2. Running on top of the machine operating system 100 is a database management system 102 which may also be viewed as an operating system, albeit a higher level operating system. The database management system 102 on the server manages storage and retrieval, including installation and deletion, of objects and otherwise manages the database. At the next higher level are the objects of the database such as tables, indexes, views, and triggers. In FIG. 6, a stored procedure 104 is shown at this level. The stored procedure is a collection of, for example, SQL statements describing operations to be performed by database management system 102.

3. THE MEMORY/CACHE SYSTEM

Figure 3:
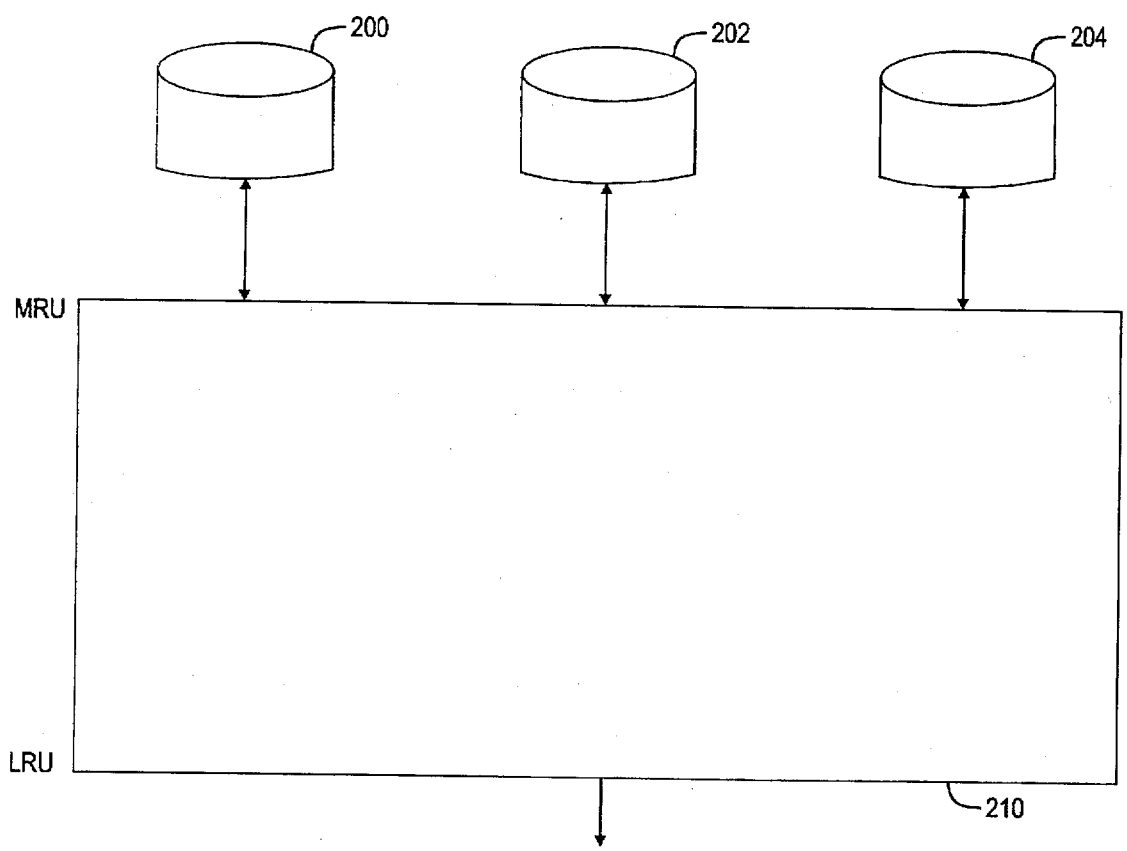
FIG. 3 is a diagram showing the memory organization of conventional database management systems.

FIG. 3 shows a memory arrangement of a conventional database having a single buffer cache. The system may have a plurality mass storage devices including three disks 200, 202, and 204 which collectively store all the database records. When a record stored on a disk is required for a database operation, that record is first transferred to a buffer cache 210 and then processed as required by the operation. Thereafter, the record is temporarily held in buffer cache 210 before being deleted according (LRU/MRU) rules for example.

As noted, the buffer cache is a section of memory from which data objects can be accessed relatively faster than from the storage devices such as disks 200, 202, and 204. This is because the memory on which the buffer cache 210 resides typically provides access to stored data through electrical rather than mechanical means. Depending on the computer configuration, the difference between processing speed and I/O speed (operations between the disk and the memory or processor) can be anywhere from 10:1 to more than 100:1. In other words, a system able to process one million instructions per second can at best perform one hundred thousand or one-tenth as many reads or writes from a disk during that same second. Thus, computer systems having large databases must frequently wait for I/O operations to occur during processing. The system of this invention improves performance by reducing the number of disk I/O steps. This is accomplished allowing the user to allocate specifically designated buffer caches for data objects which are likely to be accessed in future operations.

Figure 4:
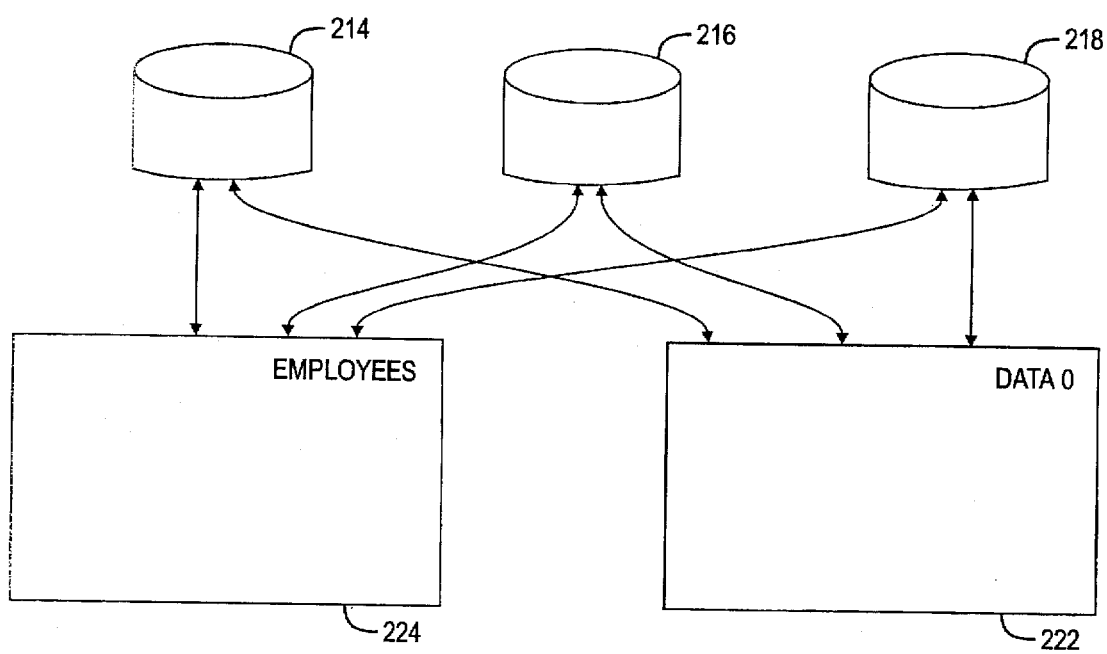
FIG. 4 is an illustration showing a memory including multiple buffer caches organized in accordance with the present invention.

FIG. 4 shows how memory is configured in a preferred embodiment of the present invention. The memory is partitioned into at least two buffer caches 222 and 224, each of which has a "name" or some other label. In this case, the name of buffer cache 224 is "employees," and the label of buffer cache 222 is "data 0" (which here denotes a default buffer cache). Each of three storage devices 214, 216, and 218 can conduct I/O operations with each of the buffer caches as indicated by the two arrows connecting each disk to the buffer caches. Although FIG. 4 shows only two buffer caches, the present invention can employ three or even more instances of such buffer caches, each of which is separately addressable.

The additional named buffer caches may provide relatively long-term storage for specific data objects. Each additional buffer cache is reserved for a limited group of objects—usually frequently-used hot items. Data objects that meet the criteria for storage in a named buffer cache are automatically stored in that buffer cache whenever they are accessed from a storage device. For example, if data records pertaining to employees of an organization are frequently accessed, a database user may wish to reserve an "employees" buffer cache for all data records residing in those tables containing employee data records. Other data, not specifically bound to the "employees" or some other named buffer cache, would be stored in a default buffer cache denoted "data 0" in FIG. 4.

The entire schema of a default buffer cache is replicated for each named buffer cache. Thus, all rules pertaining to the default buffer cache are also applied to each of the other named buffer caches. For example, in a preferred embodiment of this invention, each reserved buffer cache stores data objects in a queue according to LRU/MRU rules.

Although the use of LRU/MRU rules in a single buffer cache can slow the system, their use in a multiple cache environment does not present the same difficulty. Specifically, when data objects are stored in reserved buffer caches, they generally remain in memory longer than when they are stored in a default buffer cache. This is because the I/O traffic is generally lighter in a reserved buffer cache than in the default buffer cache. Thus, the hot items bound to named caches are more likely to be stored in memory when they are to be accessed.

The database user or database administrator can control the number, sizes, names, and configurations of the buffer caches in memory. This information is preferably stored in a catalog, referred to herein as a "system cache catalog." Further, the user can control the identity of those data objects which are bound to specific named caches. Specifically, the user binds objects meeting predefined criteria (e.g., an object pertains to a particular subject such as employment) to particular buffer caches. The user binds data objects to named buffer caches by running a system stored procedure which applies binding attributes to the selected data objects. A catalog referred to herein as the "system attributes catalog" lists the bound objects (e.g., tables and indexes) and identifies the specific named buffer caches to which they are bound. By consulting this catalog, the system determines in which buffer cache an accessed data object can be stored.

In addition to partitioning the memory into multiple buffer caches, the present invention allows the user to partition the individual buffer caches into multiple memory pools. This aspect of the invention provides advantages in memory management regardless of whether the system employs more than one buffer cache. Each memory pool within a buffer cache contains a plurality of identical MASSes (the smallest units of storage in a buffer cache). For example, one memory pool of a buffer cache may contain 500 k MASSes of 2 bytes each, while a second memory pool of the buffer cache may contain 100 k MASSes of 64 bytes each. Thus, each named buffer cache can be tailored to the type of objects to be stored therein. Buffer caches intended to hold relatively large data objects would be preferably set up with memory pools having relatively large data blocks.

The user can dynamically define new memory pools within a buffer cache and can adjust the sizes of the memory pools to accommodate demand. The user can also eliminate one or more memory pools as necessary.

When copying from a disk to a buffer cache, MASSes of memory within a memory pool of the buffer cache are filled one at a time until the entire amount of data being accessed is copied. Thus, if the amount of data being copied is 5 kilobytes and the MASSes in the memory pool are 2 kilobytes each, the system will first fill one of the 2 kilobyte MASSes, then a second 2 kilobyte MASS, and finally one half of a third 2 kilobyte MASS.

Figure 5:
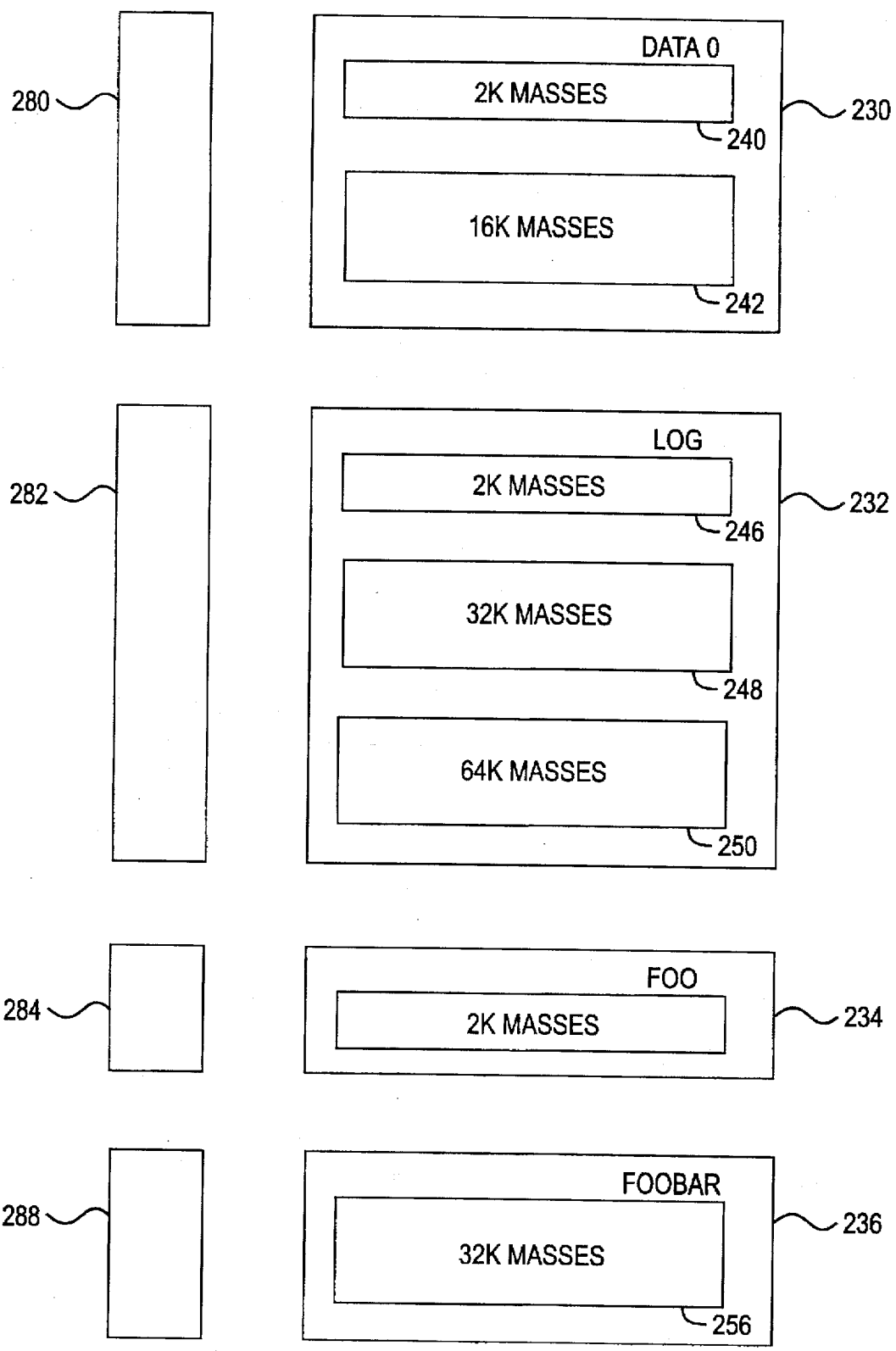
FIG. 5 is a diagram showing an exemplary memory partition in accordance with the present invention, including multiple buffer caches, some of which have multiple memory pools.

FIG. 5 shows an arrangement of buffer caches in memory, including a default buffer cache 230 ("data 0"), a buffer cache named "Log" 232, a buffer cache named "Foo" 284, and a buffer cache named "Foobar" 236. As shown, each buffer cache has one or more memory pools. The default buffer cache 230 contains two memory pools, one containing 2 k MASSes 240 and the other containing 16 k MASSes 242. The buffer cache named Log 320 contains three memory pools, one containing 2 k MASSes 248, a second continuing 32 k MASSes 246, and a third containing 64 k MASSes 250. Both of the buffer caches "Foo" and "Foobar" contain but a single memory pool. In the case of buffer cache Foo, the memory pool 254 contains 2 k MASSes, and in the case of buffer cache Foobar 236, the memory pool 256 contains 32 k MASSes. The different sized MASSes provide the database user with additional flexibility in handling I/Os of various data volumes. In preferred embodiments, the system selects a memory pool for storing a particular data object based upon the relative volume of data being accessed in a given operation. Data objects copied as part of large data transfers are stored in memory pools having larger MASSes, while data objects copied as part of small random transfers are stored in memory pools having smaller MASSes.

Each buffer cache has an associated hash table containing pointers to each MASS located in the buffer cache. In FIG. 5, hash tables 280, 282, 284, and 288 are associated with buffer caches 230, 232, 234, and 238, respectively. A system seeking to access a particular data object uses a hash table to determine whether and where that data object resides in the buffer cache. As is known in the art, a hash table is a list of pointers to memory locations. The location of a pointer within a hash table is determined according to a unique mathematical function that has as its arguments certain attributes of the object to which the pointer points. The system uses the relevant attributes of a particular object to look up a pointer to that object in the hash tables. In a preferred embodiment, the relevant attributes of an object are that object's page number, object ID, and database ID.

It should be noted that the total amount of memory occupied by the buffer caches does not significantly effect the speed at which data objects are accessed. Thus, the buffer caches can occupy a relatively large amount of memory and still access memory quickly. This is because the system is required to scan only the hash tables (not the entire cache) when determining where in memory the desired data object is located. Although larger (or more) buffer caches require larger hash tables, these tables can still be searched rapidly. The difference in time between searching a large hash table and a small hash table is negligible. Thus, a data object located in a relatively larger buffer space can be accessed substantially as fast as an object located in a relatively smaller buffer space.

As noted, the user can specify how to partition memory within the buffer cache. For example, the user can specify that the buffer cache is divided into various memory pools, each with MASSes of a predefined size (e.g., 2 kilobyte chunks, 4 kilobyte chunks, 128 kilobyte chunks, etc.). In addition, the user can specify the percentage of the total buffer cache that a particular memory pool occupies. For example, the user may determine that it is desirable to have one memory pool of 4 kilobyte chunks that occupy 80% of the buffer cache because the majority of transition access 4 k pages of data. The same user may decide to designate the remaining 20% of the buffer cache as a second memory pool, having 128 kilobyte chunks of memory. This might be appropriate because the database must access large volumes of data that will need to be used in preparing a particular type of daily report. Because the larger block of data are required less often, only 20% of the buffer cache need be devoted to them.

FIG. 6 shows the relevant entries in a system cache catalog. The total size of each buffer cache in memory is represented in the cache catalog by (1) the number of MASSes in each memory pool, and (2) the size of the MASSes in each memory pool. The system cache catalog includes one row for each memory pool of each buffer cache. In the embodiment shown in FIG. 6, each such row lists a MASS size (first column), a pool size (second column), a wash percent (third column), a status (fourth column), and a name (fifth column). The cache named "Log" in FIG. 6 has three memory pools (as indicated by the three rows for "Log"), while the cache named "Foobar" contains only a single memory pool. In the catalog shown in FIG. 6, the default buffer cache, data 0, contains two memory pools: a first containing 600 k individual 2 k MASSes and a second containing 200 k individual 16 k MASSes. For purposes of comparison, the buffer cache "Foo" contains one memory pool and it contains 200 k individual 2 k MASSes.

The wash percent (column 3) represents a fraction of each memory pool that is set aside for incoming data pages. For example, if a buffer pool has a pool size of 200 and a wash percent of 10, 20 MASSes at the LRU end of that buffer pool are free for reading in new data pages. As new data is read into a buffer cache, it is stored in the MASSes available in the wash area of the buffer cache. Existing data in the buffer cache is moved towards LRU. When such data passes a line of demarcation corresponding to the wash area cut off, it may be deleted and written over. Thus, MASSes in the wash area are available for "cleaning."

The status column of the cache catalog provides a status of each buffer pool. For purposes of this invention, the status may be either "normal" or "log." Buffer caches designated "normal" can accept any type of material. However, buffer caches designated "log" are reserved for, of course, log data.

4. MEMORY MANAGEMENT PROCESSES

The following example is provided to illustrate how a memory management process of the present invention may be employed. In this example, the database owner is a business that has several employees and various customers. Information pertaining to the employees is held in an "employee" table. Each row of the table pertains to a different employee and includes such information as the employee's salary, starting date, company department, marital status, etc. The database also includes a table listing the company's customers. That table contains such customer information as the date on which the customer most recently purchased an item, the yearly dollar volume of business done by that customer, the customer's business address, etc.

The memory of the computer system on which the database management system runs, contains only two buffer caches: one entitled "employees" and another entitled "data 0" (i.e., the default buffer cache). The "employees" buffer cache has been reserved for all data objects stored in either the employee table or an index table for the employee table. No other data objects are bound to the employees buffer cache. A company system administrator has previously bound the employee and employee index tables to the employees buffer cache by running a system stored procedure which attaches a binding attribute to selected data objects. These attributes appear in a system attributes catalog.

As part of an employee evaluation, a company manager wishes to review all the employees having a surname of Smith. He initiates this review by typing in the SQL command "SELECT* Smith." As will be understood by those familiar with SQL, this statement retrieves all database records containing "Smith." In this case, the database contains records for John Smith, Jeff Smith, Roberta Smith and Samantha Smith. No other Smith's are contained in the database. All these Smith's are employees. Further, all these Smith records are contained in the employee table that has previously been bound to the employees buffer cache.

In response to the SQL command "SELECT * Smith," the system first determines the location of all the Smith records by consulting indexes for the various tables in the database. It then identifies the table (or tables) in which the Smith records are contained and determines whether that table is bound to any specific buffer cache. In this case, all the Smith records are contained in the employee table which is bound to the "employees" buffer cache (as indicated in the system attributes catalog). After the system determines this, it consults the employee hash table to determine whether the individual Smith records are already in the "employees" buffer cache. If not, it loads them into that cache for further processing.

Assuming that at least some of the Smith records are not currently located in the employees buffer cache, the system must determine where in that buffer cache to store them. In some buffer caches, this is not an issue because all storage blocks are identical, i.e. they all have the same storage capacity. In the employees buffer cache, however, there are two memory pools: a first memory pool having 2 kilobyte MASSes (storage blocks) and a second memory pool having 32 kilobyte MASSes. As noted memory pools having two different size MASSes are provided to allow for more efficient use of the available buffer cache storage capacity. Larger MASSes are used when a relatively large volume of data is accessed and smaller MASSes are used when a relatively small volume of data is accessed. In this case, the system recognizes the "SELECT *" command as requesting a potentially large number of records and therefore estimates that the volume of data to be transferred is going to relatively large. It concludes that the data should be stored in the memory pool having the largest MASSes, i.e., the second memory pool. The system then loads the Smith records into the second memory pool of the employees buffer cache.

On another occasion, the company manager wants to check the account balance of a customer Harry Jones of 23 Rosemont Boulevard, in Oakland. Records for several individuals by the name of Jones are present in the database but there is only one record of a Harry Jones meeting the above description. Further, a search of the system attributes catalog indicates that Harry Jones record is not bound to any particular named buffer cache. Thus, when the system retrieves the record for Harry Jones, it copies that record to a default buffer cache ("data 0") rather than to a named buffer cache.

In this example, the default buffer cache has memory pools of 2 kilobyte and 64 kilobyte MASSes. Because the process of selecting the record for Harry Jones is essentially random (i.e., it involves a single record), the system estimates that the total volume of data to be accessed is relatively small. Thus, the system specifies that the Harry Jones record will be stored in the memory pool containing 2 kilobyte MASSes in the default buffer cache.

Figure 7:
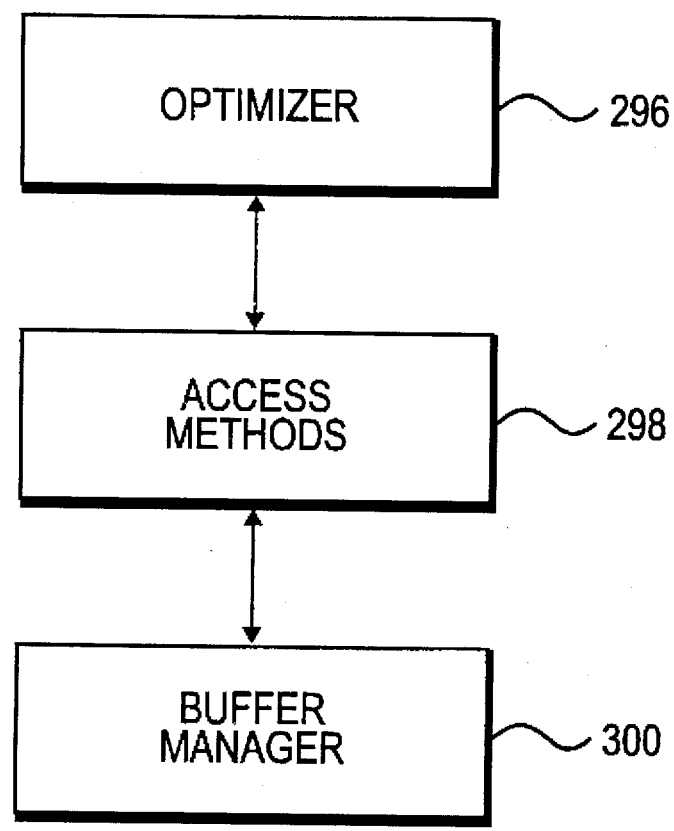
FIG. 7 is a block diagram showing the arrangement of relevant database entities used in a preferred embodiment of the present invention.

As illustrated by the above example, the system of this invention automatically determines in which buffer cache a particular data object belongs. And if the buffer cache has multiple memory pools, the system also determines in which memory pool the data object belongs. The database management entities that are important in these decisions are shown in FIG. 7. Although these entities are present in other database management systems, they take on additional roles in the context of this invention. At the highest level of interest in this invention is an optimizer 296, which serves to decide the best strategy for accessing data pages0 such that the amount of I/O is minimized. In the systems of this invention, the optimizer also determines (1) in which of the multiple buffer caches the data object will be stored and (2) in which of the memory pool of the identified buffer cache the data object is to be stored. At the next lower level is an entity known as the access methods 298 which identifies the particular data pages and table rows in which a desired data object resides. Finally, at the lowest level of interest in this invention is a buffer manager 300 which in conventional systems loads data into and removes data from a single buffer cache. In this invention, the buffer manager performs this role for multiple buffer caches.

In a preferred embodiment, the methods of this invention are initiated when the optimizer receives a query requiring access to at least one data object. If the system attributes catalog specifies a particular buffer cache for the data object, the optimizer directs that the object will be copied to that buffer cache when accessed. If not, optimizer directs that the data object will be copied to a default buffer cache. After the optimizer determines in which buffer cache the data object should be stored, the system must determine whether the object is currently stored in that buffer cache. The data object may be stored there because, for example, it had been copied during an earlier transaction. This step is necessary to prevent the system from copying from the disks when the desired data is already in a buffer cache.

The system determines whether a buffer cache contains the selected data object as follows. The access methods system element consults an index to identify a page number on which the data object is stored. Indexes are generally used with databases to quickly determine where particular objects are located. Although various index forms are suitable, a preferred index is structured as a tree. At each level of the tree, a series of categories are provided. For example, the index may be divided alphabetically such that the first level divides the data object names into A–M and N–Z categories, the second level further subdivides the data object names into A–G and H–M categories, and so on. Eventually, the last layer of the index or "leaf" level is reached. This level includes a listing of the individual data objects and their location in the disks by page number.

Once the access methods identifies the page number on which the data object is stored, the buffer manager consults the appropriate hash table to determine whether the data object having the identified page number is stored in the buffer table associated with the hash table. Because the hash table specifies the location of each data object within the buffer cache, the desired object can be accessed. If the hash table shows that the data object is not located within the buffer cache, the system may conclude that the page is stored only in the disks. The buffer manager then reads the necessary data page into the appropriate buffer cache and memory pool (as specified by the optimizer). Whether the page is initially stored in a buffer cache or only in the disks, the buffer manager sends a pointer (or memory reference) back to the access methods. This allows the access methods to find the selected data object.

If the system determines that the desired data object is not currently stored in memory, the optimizer must determine which memory pool (assuming the selected buffer cache has more than one) will be utilized most efficiently when accessing the data. To do so, the optimizer must first estimate the volume of data that is to be read into memory by one of a variety of methods. In a preferred embodiment, it is done by determining whether the operation requires access to a random object.

Typically, random access is employed in an OLTP environment and non-random access is employed in a DSS environment. In DSS, the optimizer is instructed to fetch all the data associated with all the relevant accounts (e.g., SELECT* Smith). Ideally in DSS, the buffer space MASSes should be sufficiently large that large volumes of data (comparable to those commonly encountered in DSS) can be efficiently read into memory in a single operation. In OLTP, on the other hand, the cache MASSes should be smaller (e.g., the size of a typical page of data or about 2K) to allow smaller volumes of data to be read in without wasting large amounts of buffer space.

Previously, database management systems were optimized to handle either DSS or OLTP transactions, not both. This invention provides a mixed system allowing data from both types of transaction to be treated efficiently. Thus, for example, if the system determines that the data is from an OLTP, it directs that the data be copied to a memory pool having smaller MASSes. On the other hand, if the system determines that the data is from a DSS, it directs that the data be copied to a memory pool having relatively large MASSes. In systems with more than two memory pools, alternative methods of determining the memory pool in which the data is to be stored can be employed. Thus, it is possible that memory pools having intermediate size data chunks could become the immediate destination of some data objects. An example of an alternative process for determining the memory pool in which data objects will be stored involves determining the row size of a table being read into a cache. If the row size is greater than a predetermined value, it is stored in the buffer pool having the largest MASSes.

Figure 8:
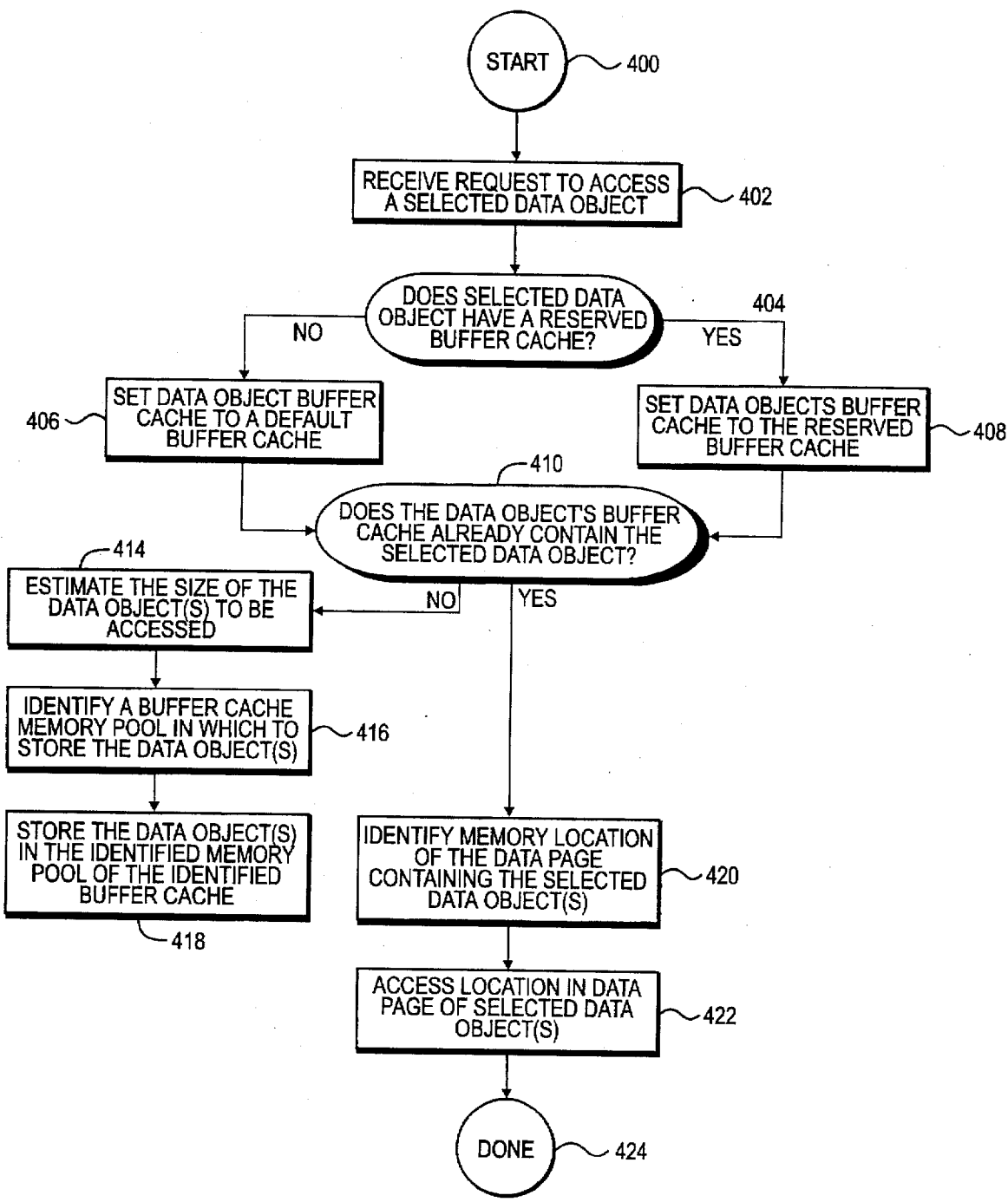
FIG. 8 is a process flow diagram showing the general steps by which the system accesses data objects in accordance with the present invention.

FIG. 8 presents a process flow diagram of the method discussed above. The process begins at 400 and in a step 402 the system receives a request to access a selected data object. This request may, of course, come from various sources. It may be part of an OLTP or DSS environment. Next, a decision step 404 determines whether the selected data object has a reserved buffer cache. As noted, this step may be accomplished by consulting a system attributes catalog which indicates whether the data object is bound to any specific buffer cache. If step 404 determines that the data object does, in fact, have a reserve buffer cache, a step 408 sets that data object's buffer cache equal to the reserved buffer cache. If, on the other hand, step 404 determines that the data object does not have a reserve buffer cache, a step 406 sets the data objects buffer cache equal to the default buffer cache. Either way, a decision step 410 next determines whether the data objects buffer cache already contains the selected object. If not, the data object is loaded into the appropriate buffer cache before further processing. A three step process including steps 414, 416, and 418 is employed to load a data object into a buffer cache. Thus, if the question proposed in decision step 410 is answered in negative, the process proceeds to step 414 where the system estimates the volume of data to be accessed. This volume may include a selected data object as well as other data. After the data volume has been estimated, step 416 identifies a memory pool of the data, object's buffer cache in which to store the data objects. Of course, if the buffer cache contains only a single memory pool, step 416 is not pertinent. Next step 418 stores the selected data object in the memory pool identified in step 416. Thereafter, in step 420, the system identifies the memory location of the data page containing the selected data object. This page is then accessed to obtain the selected data object in a step 422. The process is completed at 424. If decision step 410 determines that the buffer cache already contains the selected data object, the loading steps 414, 416, and 418, are not performed, and process control is directed for step 420.

Figure 9:
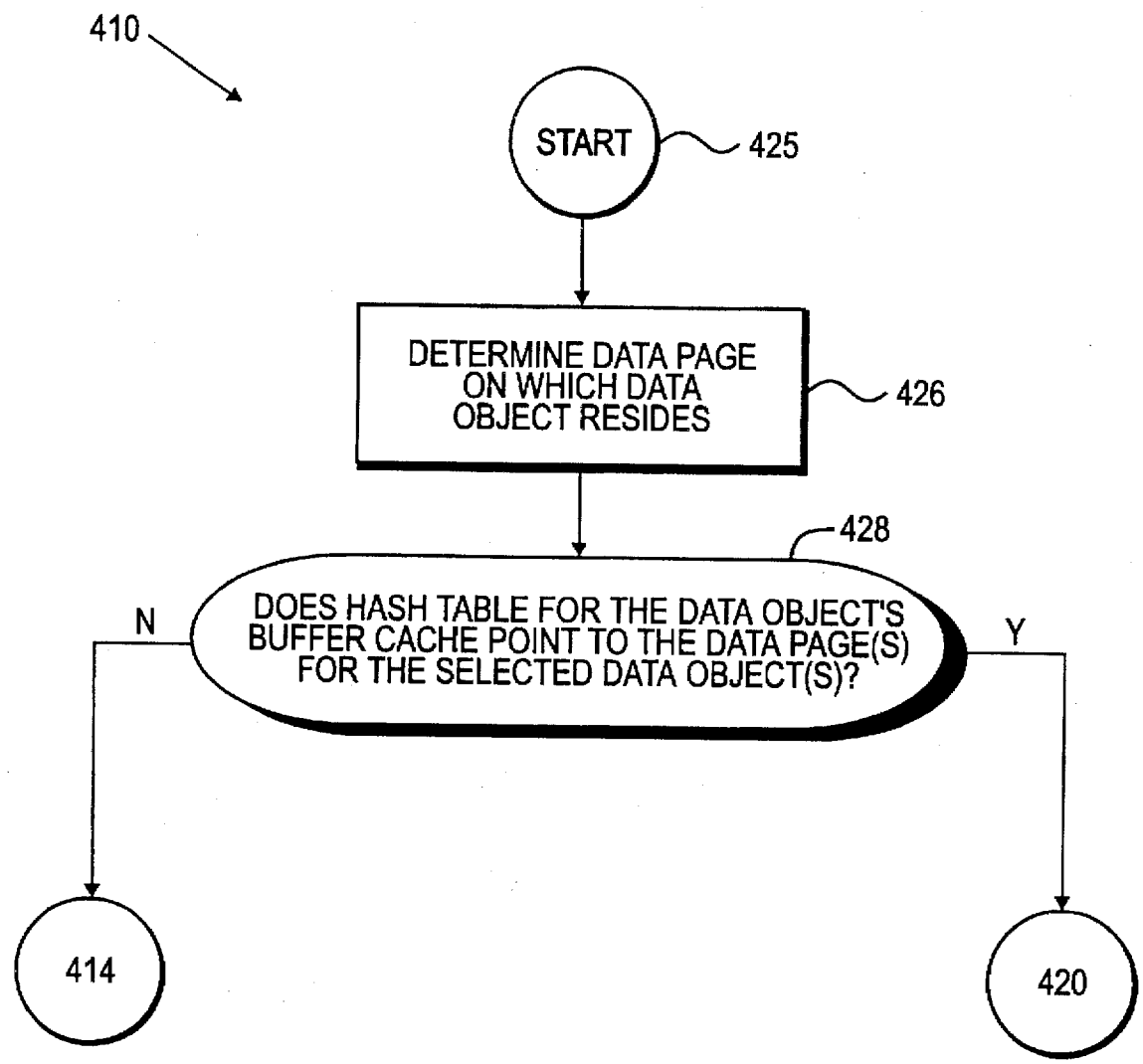
FIG. 9 is a process flow diagram detailing how the system of this invention determines in which memory pool of a buffer cache to store a selected data object.

A preferred process for determining whether a selected data objects buffer cache already contains that object (step 410 of FIG. 8) is detailed in FIG. 9. The process begins at 425 and proceeds to a step 426 which identifies the data page on which the selected data object resides. This is typically performed with the aid of index, such as a binary index described above. Once the data page in which the selected data objects reside has been identified, a decision step 428 determines whether a cache table for the data objects buffer cache contains a pointer for the data page identified in step 426. If not, the data object is not currently stored in memory, and process control is directed to step 414. If, on the other hand, the cache table does contain a pointer to the selected data object, that object currently resides in memory, and process control is directed to step 420.

Figure 10:
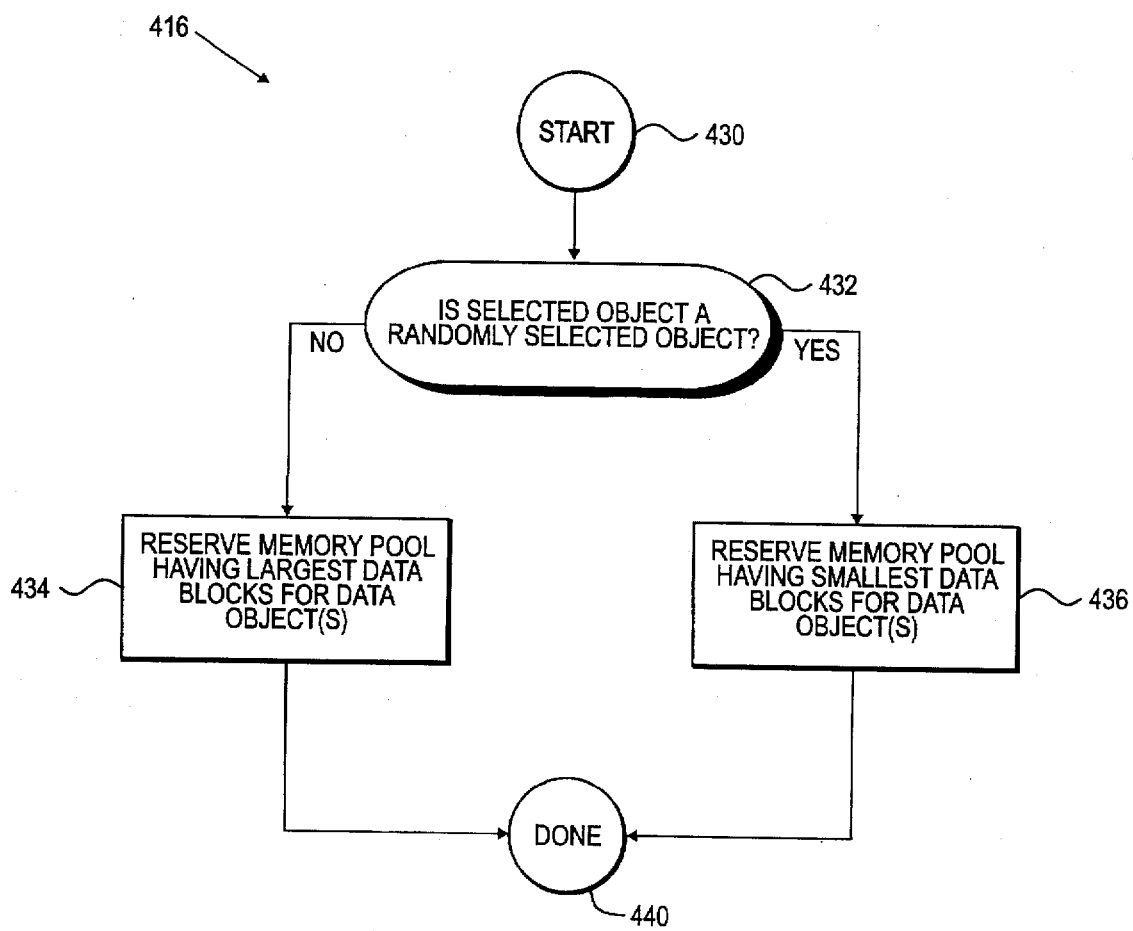
FIG. 10 is a process flow diagram detailing how the system of this invention determines whether a selected data object is already stored within an appropriate buffer cache.

The process of identifying a buffer cache memory pool in which to store the selected data object (step 416 of FIG. 8) is shown in FIG. 10. Most generally, the system directs the selected data object into a memory pool having small MASSes if estimated volume of data to be transferred is small. On the other hand, the data object is copied to a memory pool having larger MASSes if the estimated volume of data to be transferred is large. FIG. 10 details a specific implementation of this general process. It begins at 430, and in a decision step 432, determines whether the selected object is a "randomly" selected object. Randomly selected objects are assumed to correspond to a small volume of data being transferred. Thus, if decision step 432 is answer in the affirmative, a step 436 reserves the memory pool having the smallest MASSes. The process is thereafter completed at 440. If, however, the selected object is not randomly selected, a step 434 reserves the memory pool having the largest MASSes, and the process is completed at 440.

In a Symmetric Multiprocessing Environment (SMP), all the processes have access to the same items. Thus, each process has access to the same buffer cache. So that data is not simultaneously written to the same buffer cache, the system employs a synchronization lock to temporarily freeze the entire buffer cache during the time it takes the accessing process to access desired data. Although a given access operation in the buffer cache may require only a tiny fraction of a second, if the system is handling multiple processes, each of which requires repeated rapid access to the buffer cache, the speed of the system can slow considerably. For example, if there are hundreds of users of ATM machines concurrently accessing memory, the system can be considerably slowed.

In preferred embodiments, the multiple buffer caches provided in the present invention are separately synchronized. Thus, only a fraction of the total memory is locked when a process accesses a single data object. This can be understood as follows. If a system contains two buffer caches (each of the same storage capacity), one process can request access to an object in one of the caches while another process can request access to a different object in the other buffer cache at the same time. In other words, two different processes can access their desired objects in memory at the same time without interfering. Although buffer caches are locked during this access period, two different processes are permitted to access at the same time. This represents an improvement over conventional systems where only a single process could operate at any given time. Thus, the overall speed of the database management system is increased.

Figure 11:
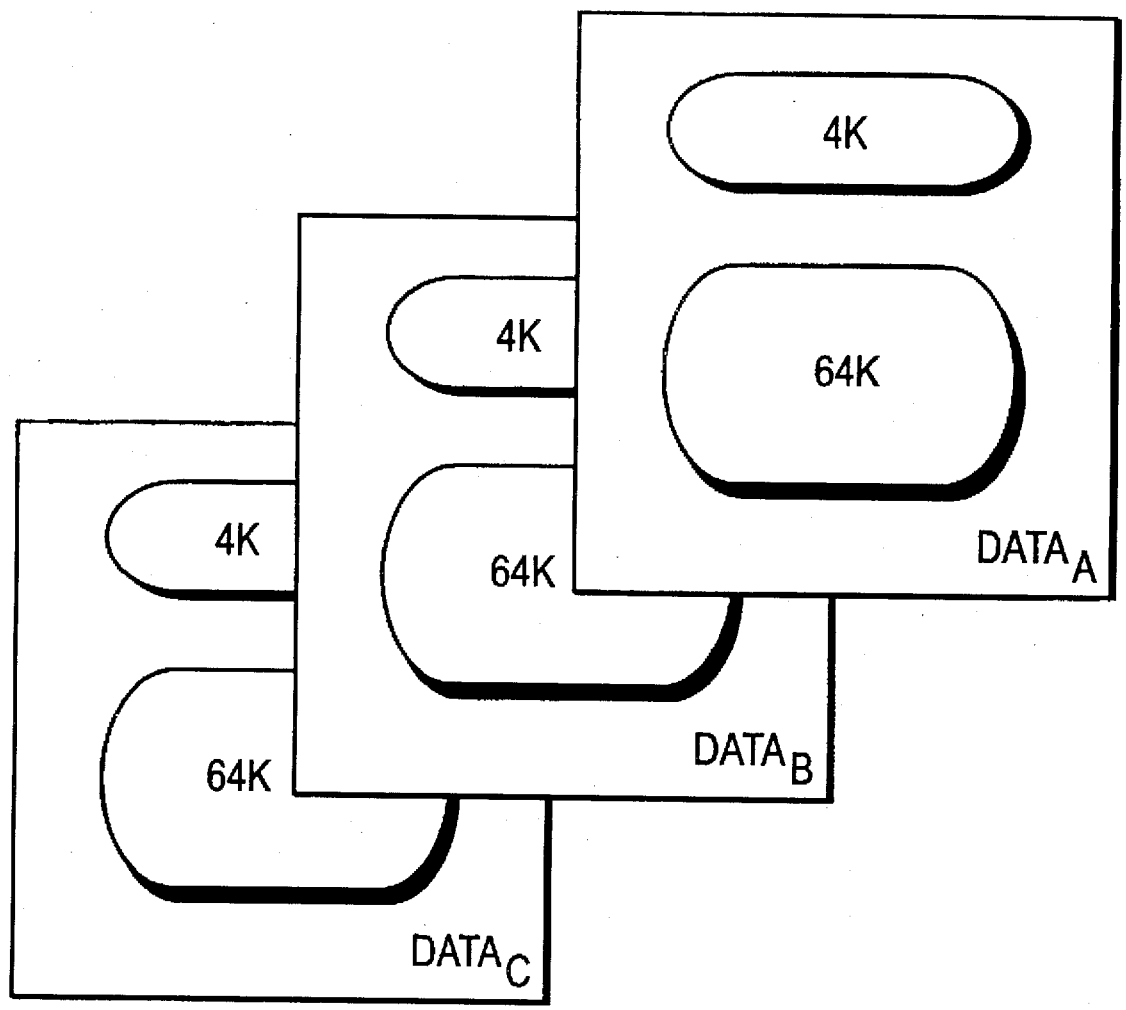
FIG. 11 is a diagram showing an alternative embodiment in which a buffer cache is partitioned into sub-caches each having it own synchronization.

Even greater processing improvements can be realized when the memory is further partitioned into multiple instances of a given buffer cache as shown in FIG. 11. Each replication of the buffer cache has the same name and same memory pool partition. However, the different replications store different data objects. The hash table points the access methods to the proper replication of the buffer cache. Thus, only one specific replication of the buffer cache is frozen when a data object in that general buffer cache is accessed. In the example shown in FIG. 11, a "data" cache containing 4 kilobytes and 64 kilobytes memory pools is divided into three replications: data A, data B, data C. Each of these three replications has the same size and memory pool allocation, but has different data objects stored therein. Thus, when a process access an object in the "data" cache, only one third of that buffer cache is locked, the instance of data in which a desired data object is stored. The two other instances of "data" remain unlocked and available for simultaneous access by other processes. Further divisions of a given buffer cache can lead to an even greater advantage in concurrent processing.

Figure 12:
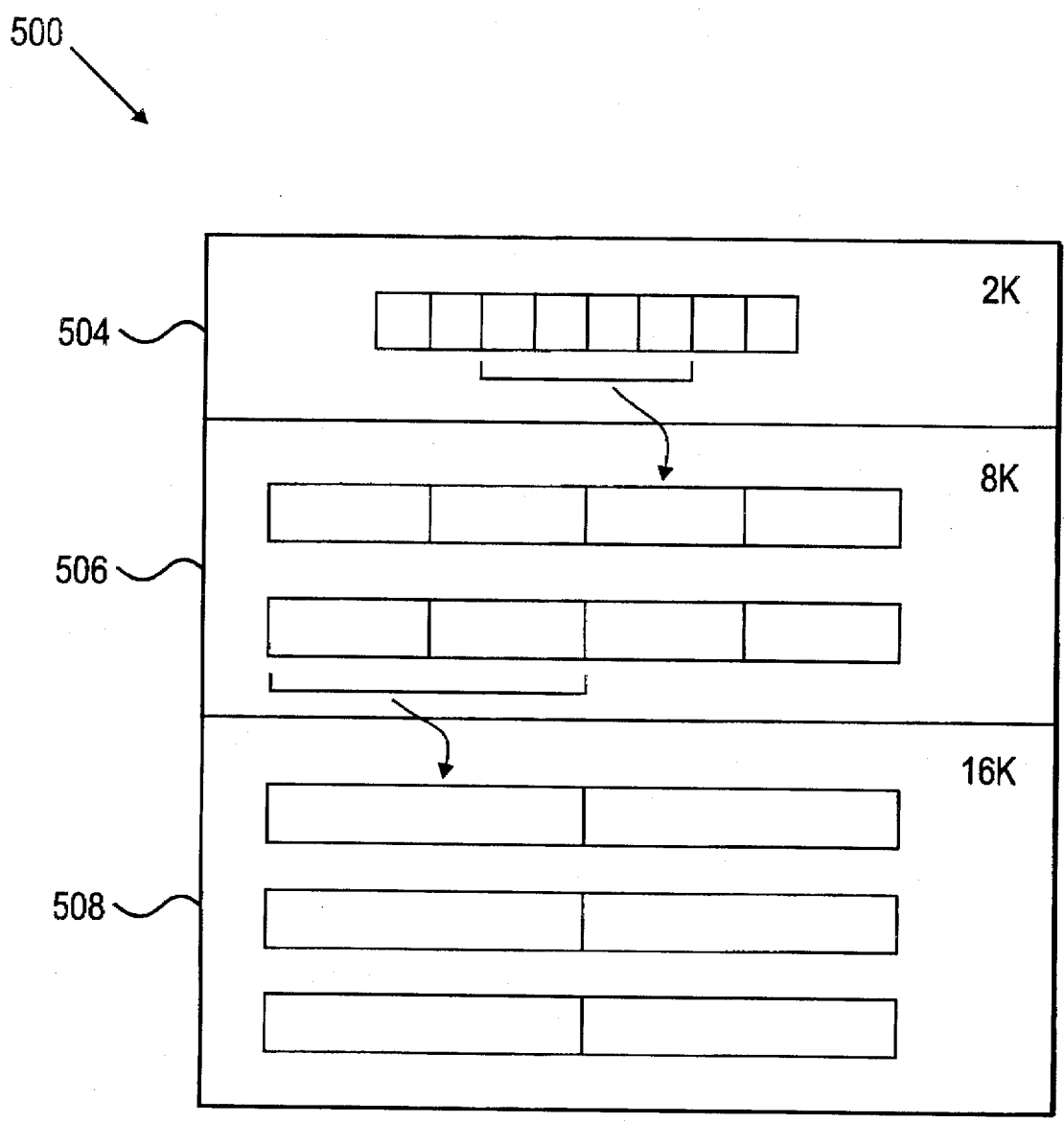
FIG. 12 is a diagram of showing how data objects stored in a single buffer cache with multiple memory pools may be coalesced according to an embodiment of the present invention.

As noted, a buffer cache can be divided into more than two memory pools, each having MASSes of different sizes. This provides additional flexibility in determining where a given data object should be stored, depending upon its size and the volume of data was transferred with. In addition, three or more memory pools in a single buffer cache may be used for the purpose of coalescing data objects as shown in FIG. 12. Coalescing involves a process by which data objects stored in a group of smaller MASSes are combined into a larger block of data that is moved into a larger MASSes found within a different memory pool. This allows the user to take relatively small pieces of data, such as those loaded in an OLTP mode, and coalesce them into larger blocks that are convenient for use in operations requiting access to relatively large blocks of data, as in, for example, DSS mode.

Coalescing provides an extra configuration advantage to the user. For example, if the user has configured a small number of 16 kilobyte MASSes and a large number of 2 kilobyte MASSes, he or she may subsequently notice that most of the transactions in the cache are DSS. Coalescing allows some of the 2 kilobyte MASSes to be moved to the 16 kilobyte pool.

FIG. 12 provides an example of the coalescing process as it may be applied to the present invention. Memory section 500 represents single buffer cache having memory pools 504, 506, and 508. Initially, small chunks of data are stored in 2 kilobytes MASSes within memory pool 504. The user may define that a block of these 2 kilobytes MASSes is to be coalesced into a 8 kilobytes block which is then stored in memory pool 506. Thereafter, data in two of the 8K MASSes from memory pool 506 may be combined to form a 16 kilobytes data block that is then stored in a 16 kilobyte MASS within memory pool 508. In this manner, small chunks of data that may have been conveniently loaded into memory during OLTP, can be coalesced within the cache to a form that is more conveniently use in DSS. Of course, the opposite approach can also employed, whereby larger data blocks are fragmented into smaller data blocks for storage in adjacent memory pools.

6. CONCLUSION

Although the foregoing invention has been described in some detail for purposes of clarity of understanding, it will be apparent that certain changes and modifications may be practiced within the scope of the appended claims. For instance, although the specification has described a database management system, other computer systems may be used as well. For example, certain graphics or text processing applications may require access to various system or user-defined data modules. Certain of these data modules could be stored in reserved buffer caches in accordance with the present invention.

What is claimed is:

1. A method of buffering data objects in a database of a computer system, the computer system having one or more storage devices on which the data objects of the database are stored, the computer system also having a memory on which the data objects may be stored temporarily and accessed relatively faster than from the one or more storage devices, the computer system also supporting an on line transaction processing (OLTP) environment in which data objects are retrieved randomly and a decision support system (DSS) environment in which data objects are retrieved non-randomly, the method comprising the following steps:

(a) allocating a portion of the memory as a buffer cache;

(b) allocating at least a first memory pool and a second memory pool each having a user configurable size within the buffer cache, the first memory pool having multiple identical storage blocks, each having a first storage capacity, and the second memory pool also having multiple identical storage blocks, each having a second storage capacity, the second storage capacity being greater than the first storage capacity;

(c) identifying a selected data object;

(d) determining whether the selected data object is selected randomly;

(e) based upon whether the selected data object is selected randomly or non-randomly, determining in which memory pool to copy the selected data object; and (f) storing the data object in the memory pool identified in step (e)

wherein the step of determining in which memory pool of the buffer cache to copy the data object determines that the data object should be copied to the first memory pool if the selected that object is randomly selected, and that the data object should be copied to the second memory pool if the selected data object is not randomly, selected.

2. The method of claim 1 wherein the step of allocating a portion of the memory as a buffer cache allocates at least two buffer caches, each of which is separately addressable.

3. The method of claim 1 further comprising a step of queuing data objects in the each memory pool of the buffer cache according to least recently used—most recently used rules.

4. The method of claim 1 wherein the step of allocating at least a first memory pool and a second memory pool within the buffer cache includes allocating at least a third memory pool with a plurality of identical storage blocks, said storage blocks of the third memory pool having a third storage capacity that is intermediate in size between the first and second storage capacities.

5. A computer system for managing the storage of data objects in a database, the computer system comprising:

one or more storage devices on which the data objects of a database are stored;

a memory in which the data objects can be stored temporarily and accessed at relatively faster rate than from the one or more storage devices;

means for copying data objects from the one or more storage devices to the memory;

a portion of the memory allocated as a buffer cache having at least a first memory pool and a second memory pool each having a user configurable size, the first memory pool having multiple identical storage blocks, each of a first storage capacity, and the second memory pool also having identical multiple storage blocks each of a second storage capacity, the second storage capacity being greater than the first storage capacity; and means for copying a selected data object to the first or second memory pool based on whether the selected data object is randomly selected, wherein the means for copying copies the selected data object to the first memory pool if the selected data object is randomly selected in an on line transaction processing (OLTP) environment and copies the selected data object to the second memory pool if the selected data object is not randomly selected in a decision support system (DSS) environment.

6. The computer system of claim 5 wherein the buffer cache further includes at least a third memory pool having a plurality of identical storage blocks having a third storage capacity that is between the first and second storage capacities.

7. In a computer comprising a processor, a memory, and a storage device, said computer including a database system storing a plurality of database tables, each table comprising a plurality of data records, a method for accessing said data records, the method comprising:

(a) allocating a portion of the memory as a buffer cache;

(b) allocating at least a first memory pool and a second memory pool each having a user configurable size within the buffer cache, the first memory pool having multiple identical storage blocks, each having a first storage capacity, and the second memory pool also having multiple identical storage block, each having a second storage capacity, the second storage capacity being greater than the first storage capacity;

(c) receiving a request for performing a database operation which require access to data objects stored within said plurality of database tables;

(d) determining whether said request occurs in response to an OLTP query or a DSS query;

(e) if said request is determined to be in response to a DSS query copying said data objects to said second memory pool, and if said request is determined to be in response to an OLTP query, copying said data objects to said first memory pool.

8. The method of claim 7, wherein said first buffer pool has storage blocks which are 2K in size and said second buffer pool has storage blocks which are greater than 2K in size.

9. The method of claim 7, wherein determining whether said request occurs in response to an OLTP query or a DSS query determines that said request is in response to an OLTP query when said database operation comprises a database query which results in random access of data records from said first database table.

10. The method of claim 7, wherein determining whether said request occurs in response to an OLTP query or a DSS query determines that said request is in response to a DSS query when said database operation comprises a database query which results in non-random access of data records from said first database table.

11. The method of claim 7, wherein said second buffer pool comprises storage blocks which are at least 64K in size.

12. The method of claim 7, wherein said database operation comprises a database query operation.

13. The method of claim 12, wherein the database query operation comprises a Structured Query Language (SQL) command submitted by a client to said computer.

* * * * *